(12) United States Patent
Wegman

(10) Patent No.: US 7,331,138 B1
(45) Date of Patent: Feb. 19, 2008

(54) ROD HOLDER

(75) Inventor: Charles Wegman, Greensboro, NC (US)

(73) Assignee: C.E. Smith Co., Inc., Greensboro, NC (US)

( * ) Notice: Subject to any disclaimer, the term of this patent is extended or adjusted under 35 U.S.C. 154(b) by 0 days.

(21) Appl. No.: 10/137,786

(22) Filed: May 2, 2002

(51) Int. Cl.
*A01K 97/10* (2006.01)
(52) U.S. Cl. ...................... 43/21.2; 248/523
(58) Field of Classification Search ............. 43/21.2; 248/76, 85, 87, 519, 523; 47/41.13, 41.14
See application file for complete search history.

(56) References Cited

U.S. PATENT DOCUMENTS

| | | | | |
|---|---|---|---|---|
| 1,053,255 A | * | 2/1913 | Ward | 248/536 |
| 3,598,129 A | * | 8/1971 | Itoda | 453/62 |
| 3,684,189 A | * | 8/1972 | Reed et al. | 239/425.5 |
| 4,007,902 A | * | 2/1977 | Pettee | 248/534 |
| 4,062,299 A | * | 12/1977 | Smith | 108/42 |
| 4,257,181 A | * | 3/1981 | Cooper | 43/21.2 |
| 4,375,731 A | * | 3/1983 | Budd | 43/21.2 |
| 4,778,141 A | * | 10/1988 | Bogar | 248/538 |
| 4,871,099 A | * | 10/1989 | Bogar, Jr. | 224/566 |
| 4,887,375 A | * | 12/1989 | Shedd et al. | 43/21.2 |
| 4,901,970 A | * | 2/1990 | Moss et al. | 248/514 |
| 4,953,318 A | * | 9/1990 | Vasseur, Jr. | 43/21.2 |
| 4,964,233 A | * | 10/1990 | Benson et al. | 43/17 |
| 5,044,597 A | * | 9/1991 | Walczak | 248/530 |
| 5,070,638 A | * | 12/1991 | Tregaskis | 43/15 |
| 5,165,197 A | * | 11/1992 | Sitton | 43/44.82 |
| 5,210,971 A | * | 5/1993 | Efantis | 43/21.2 |
| 5,261,561 A | * | 11/1993 | Hodges, Jr. | 220/735 |
| 5,457,918 A | * | 10/1995 | Plourde | 52/165 |
| 5,515,656 A | * | 5/1996 | Mihalich | 52/155 |
| 5,915,942 A | * | 6/1999 | Ratliffe | 43/21.2 |
| 6,289,627 B1 | * | 9/2001 | Gibbs et al. | 43/21.2 |

OTHER PUBLICATIONS

Page 94 from Melton International Catalog showing rod holders; 2000.
Page 144 from Overton's Catalog showing rod holders; 2001.
Pages 277 and 278 from Boater's World Catalog showing rod holders; 2001.

* cited by examiner

*Primary Examiner*—Bret Hayes
(74) *Attorney, Agent, or Firm*—MacCord Mason PLLC

(57) ABSTRACT

An integrally formed rod holder. The rod holder includes a tube open at one end and an internal stop, distal to the end. Also, the rod holder may include any one of a taper, a mounting feature, or both.

40 Claims, 7 Drawing Sheets

ROD HOLDER

BACKGROUND OF THE INVENTION (1) Field of the Invention

The present invention relates generally to a rod holder and, more particularly, to an integrally formed rod holder including a tube and an internal stop.

(2) Description of the Prior Art

In sport fishing, rod holders allow storage of fishing rods not in use and may be used to allow a rigged rod to be set in a manner to facilitate trolling behind a boat while waiting for a fish to hit the bait. Once a fish hits the bait, the sportsmanship involving reeling in the fish begins.

Current rod holders made from, for example, steel, plastic or aluminum tubing are known to possess certain difficulties. For example, plastic rod holders are prone to cracking. Although aluminum rod holders may be sufficiently strong, the use of steel stops with aluminum creates a corrosion couple. Replacing the steel stops with plastics may eliminate the corrosion couple and reintroduce the plastics failure problem. Also, to withstand the stresses and strains of holding a rigged rod, design constraints create a bulky rod holder.

The fishing environment, and the deep-sea fishing environment, may be brutal because of the sunlight, which tends to fade the color of materials, and the seawater includes corrosive agents such as salt. Coatings have been provided to rod holders for these reasons; however, coatings available for plastics and aluminum lack color fastness. Thus, there remains a need for a new and improved rod holder that is sufficiently aesthetic, regardless of the mounting method, while at the same time, is sufficiently strong enough to withstand use.

SUMMARY OF THE INVENTION

The present invention is directed to an integrally formed rod holder including a tube open at one end and an internal stop, distal to the end. Also, the rod holder may include any one of a taper, a mounting feature or both.

The mounting feature permits the rod holder to be mounted so that the longitudinal axis of the tube is at an angle with respect to the vertical. The angle with respect to the vertical may be between about 0° and 30°. For example, the angle with respect to the vertical may be any one of about 0°, about 15°, and about 30°.

The mounting feature may be a surface mounting feature. Such surface-mounting feature may include a flared transition between the tube and the surface-mounting feature to facilitate a smooth place and removal of a rod handle from the rod holder. Further, the surface-mounting feature may include at least one aperture to accommodate mounting hardware. The mounting hardware may be any one of through-hole bolts, screws, and combinations thereof.

The mounting feature may be a clamp. In such case, the mounting feature further may include a web between the tube and the clamp. The clamp may include a multi-directional alignment feature that permits the rod holder to be mounted in a variety of orientations.

Further, the clamp may include gripping surfaces to fixedly secure the rod holder and, if included, a rod. The gripping surfaces may crease the material that the clamp engages.

The clamp may include a cap that may be used to engage a material, such as, for example, a tube with the assistance of at least one fastener.

The web between the tube and the clamp may contact the tube anywhere from above the bottom of the tube to the top of the tube. Alternatively, the web may contact the bottom of the tube. In such a case, the stop and the web may be integrally formed to create additional stiffness and durability. Further, the stop, the web and the tube also may be integrally formed for even improved stiffness and durability. In either case, the open end may be flared, and whether or not flared, may include an access opening to facilitate the easy placement and removal of a rod handle from the rod holder.

The tube is thin walled. The thin walled tube may have a wall thickness between about 1 and 3 millimeters. Also, the thin walled tube may have a tube diameter (O.D.) to wall thickness ratio between about 20:1 and 50:1.

Further, the rod holder may include a polished surface. The polished surface is preferably visible.

Also, the rod holder may include a coating. The coating may be any one of functional, aesthetic and both. For example, the coating may be corrosion resistant. Alternately, the coating may be ornamental. One form of an ornamental coating is a colored coating. For example, the colored coating may be any one color selected from the group consisting of gold, black, green, red, blue, and silver.

The coating may be applied or created by any one process selected from the group consisting of physical vapor deposition (PVD), chemical vapor decomposition (CVD), electroplating, autocatalytic (electroless) plating, electrochemical conversion (anodizing), thermal spraying, conversion coating and combinations thereof. Applicant believes that a coating obtained using a physical vapor deposition (PVD) process will provide a coating that has color fastness. In the international standards for color fastness, eight is the most color fast, and anything over six will do quite well out-of-doors. One PVD coating may be a titanium nitride that typically is golden.

The taper increases distally from the open end of the tube. The taper of the rod holder may guide a fishing rod handle including an anti-rotation feature to align with the stop. The taper may be sized to accommodate at least 70% of commercially available fishing rods including an anti-rotation feature. Preferably, the taper is sized to accommodate at least 90% of commercially available fishing rods including an anti-rotation feature.

The internal stop may be integral with the tube. The end of the stop nearer to the open end may be substantially perpendicular to a longitudinal axis of the tube.

The thickness of the internal stop may be dimensioned to accommodate the anti-rotation feature of a rod handle. A typical thickness of the internal stop may be about ¼ inch.

At least the tube is cast and may be cast using any one metal selected from the group consisting of iron, titanium and aluminum (this terminology includes metals and their alloys). The tube may be cast using an iron alloy such as steel and stainless steel. The tube may be cast using any one process selected from the group consisting of die casting, investment casting and sand casting. Applicant has found that investment casting works satisfactorily.

Accordingly, one aspect of the present invention is to provide an integrally formed rod holder, a tube open at one end; and an internal stop, distal to the end.

Another aspect of the present invention is to provide an integrally formed rod holder including a tube open at one end; an internal stop, distal to the end; and a taper.

Still another aspect of the present invention is to provide an integrally formed rod holder including a tube open at one end; an internal stop, distal to the end; a taper; and a mounting feature.

These and other aspects of the present invention will become apparent to those skilled in the art after a reading of the following description of the preferred embodiment when considered with the drawings.

DESCRIPTION OF THE PREFERRED EMBODIMENTS

Figure 1:
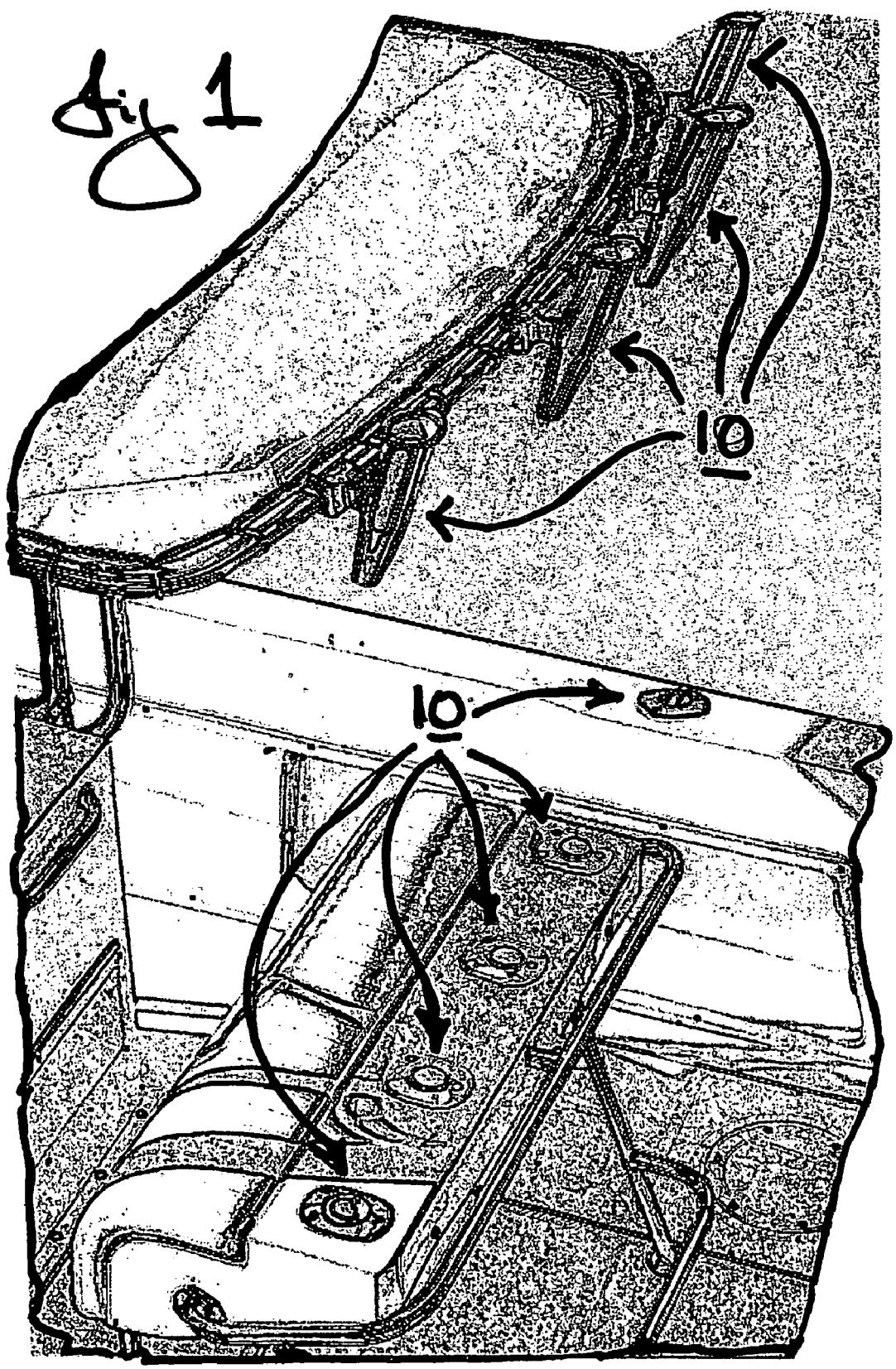
FIG. 1 is an illustration showing rod holders constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
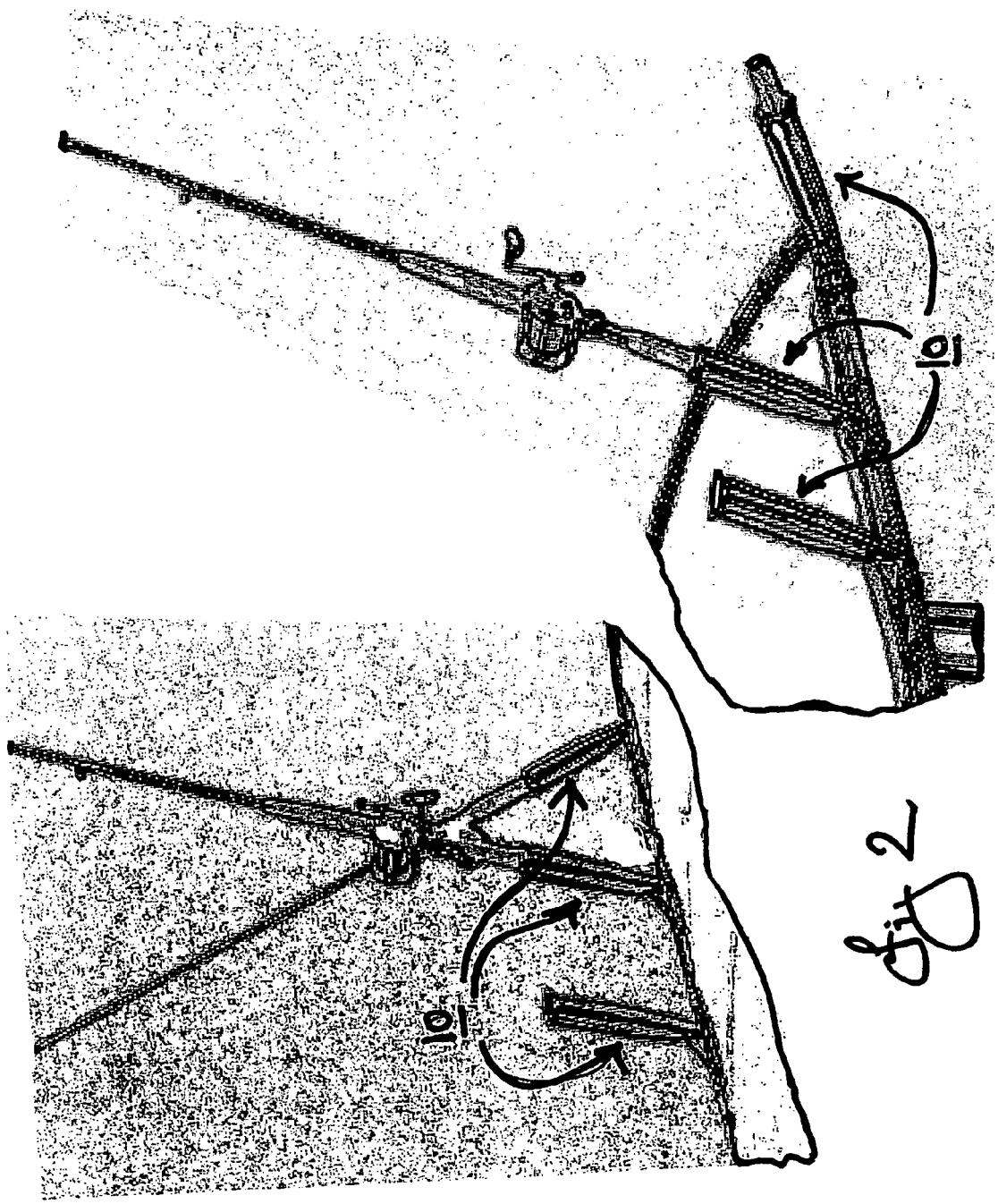
FIG. 2 is an illustration showing rod holders constructed according to the present invention.

Referring now to the drawings in general and FIGS. 1 and 2 in particular, it will be understood that the illustrations are for the purpose of describing a preferred embodiment of the invention and are not intended to limit the invention thereto. As best seen in FIGS. 1 and 2, a rod holder, generally designated 10, is shown constructed according to the present invention. As best seen in FIGS. 3A, 3B, 5A, 5B, 6A, and 6B, the rod holder 10 includes a tube 12 with an opening at one end and has an integrated internal stop 14 that is distal to the end. The tube 12 may include a taper 20 that starts at one end. Stated another way, the taper 20 progresses linearly towards the distal end of the tube 12. Also, the taper 20 may be a conic section such as a frustrum. The rod holder 10 may also include a mounting feature 16

The tube 12 may be thin walled. To that end, an appropriate type of material is used to yield the thin wall. Appropriate materials provide sufficient strength to withstand the placement, removal, and replacement of a rod in the rod holder 10 and the prolonged stress imparted by movement of the boat on rough water caused by the mass of the rod and reel stored in the rod holder. To that end, the tube 12 has a wall thickness between about 1 and 3 millimeters. Another measure of the tube 12's appropriateness may be expressed as a ratio of the outside diameter of the tube 10 to the wall thickness of the tube 10 that may be between about 20:1 and 50:1.

Figure 6:
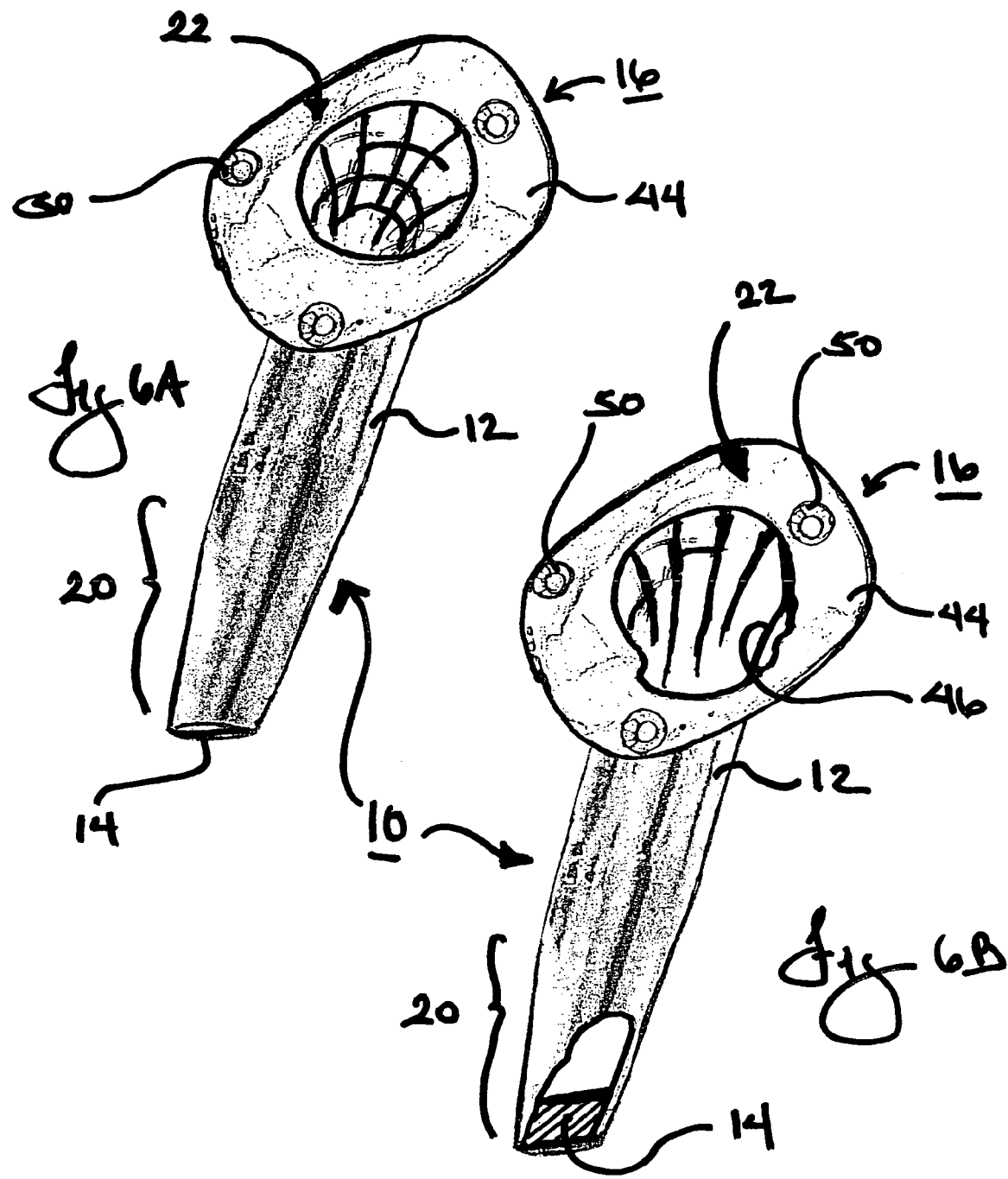
FIG. 6A is an illustration showing details of the surface mount rod holder of FIG. 1.
FIG. 6B is a cutaway illustration of the surface mount rod holder of FIG. 1.
Figure 7:
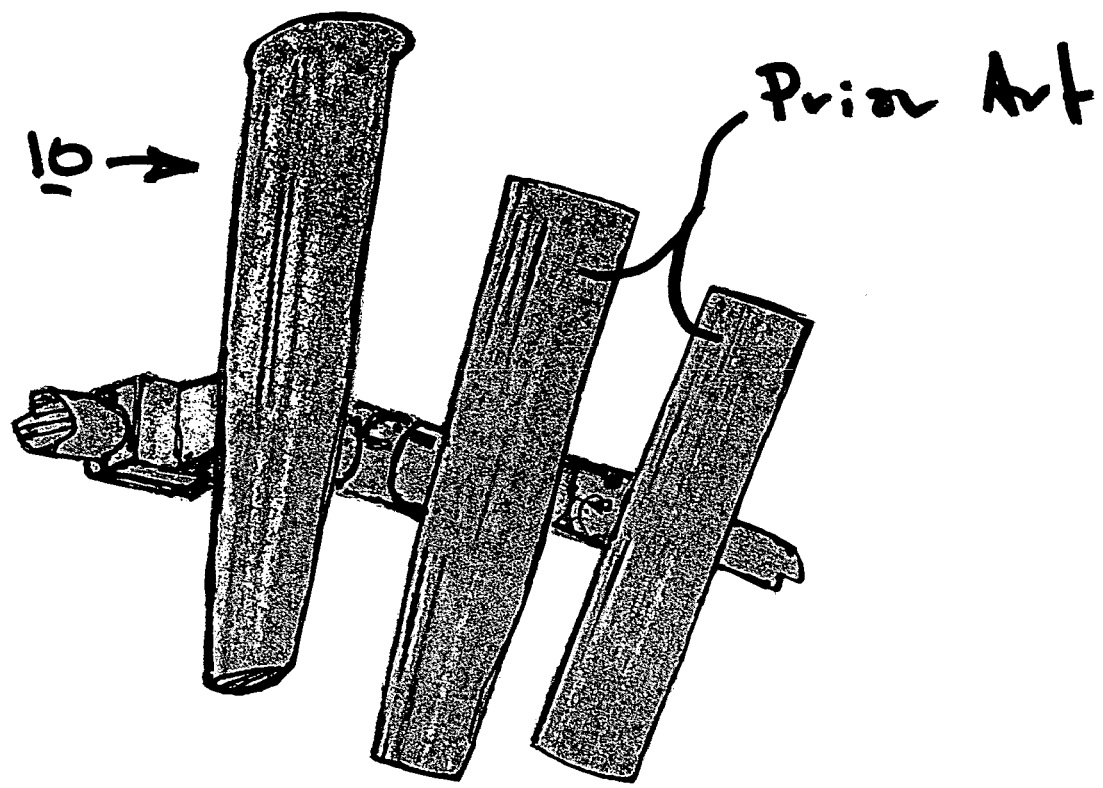
FIG. 7 is an illustration showing the rod holder constructed according to the present invention and the prior art rod holders.

Tube 12 may include a polished surface 22. As best seen in FIGS. 3A, 3B, 5A and 5B, the polished surface 22 may be the outer surface of the tube 10. As best seen in FIGS. 6A and 6B, the polished surface 22 may be the surface of the mounting feature 16 of the tube 10. Since the polished surface 22 may be an aesthetic feature of the rod holder 10, surfaces that might not be visible to an observer need not be polished. To that end, the polished surface 22 would be a visible surface.

The tube 12 may also include a coating 24. One purpose for the coating 24 may be to impart a corrosion resistance to the rod holder 10. In such a case, the coating 24 might cover all or substantially the entire rod holder 10 including the tube 12. On the other hand, the coating 24 may be ornamental. In such a case, the coating 24 may be one of a variety of colors such as gold, black, green, red, blue, and silver.

A variety of techniques exist for creating a coating on rod holder 10 including, for example, physical vapor deposition, chemical vapor deposition, plating, conversion coating or an anodized coating. In making a model of the present invention, the Applicant has used a physical vapor deposition titanium nitrite coating. Such coatings are known to be wear-resistant and also can impart an attractive gold color to the exterior of the rod holder 10.

As best seen in FIGS. 3A, 4, 5B, and 6B, taper 20 may simplify the task of engaging an anti-rotation feature of a rod end when it is inserted into the tube 12 in a manner for engaging the internal stop 14. The taper 20 may be designed to accommodate at least 70 percent, preferably at least 90 percent, of the rods that are commercially available.

Figure 3:
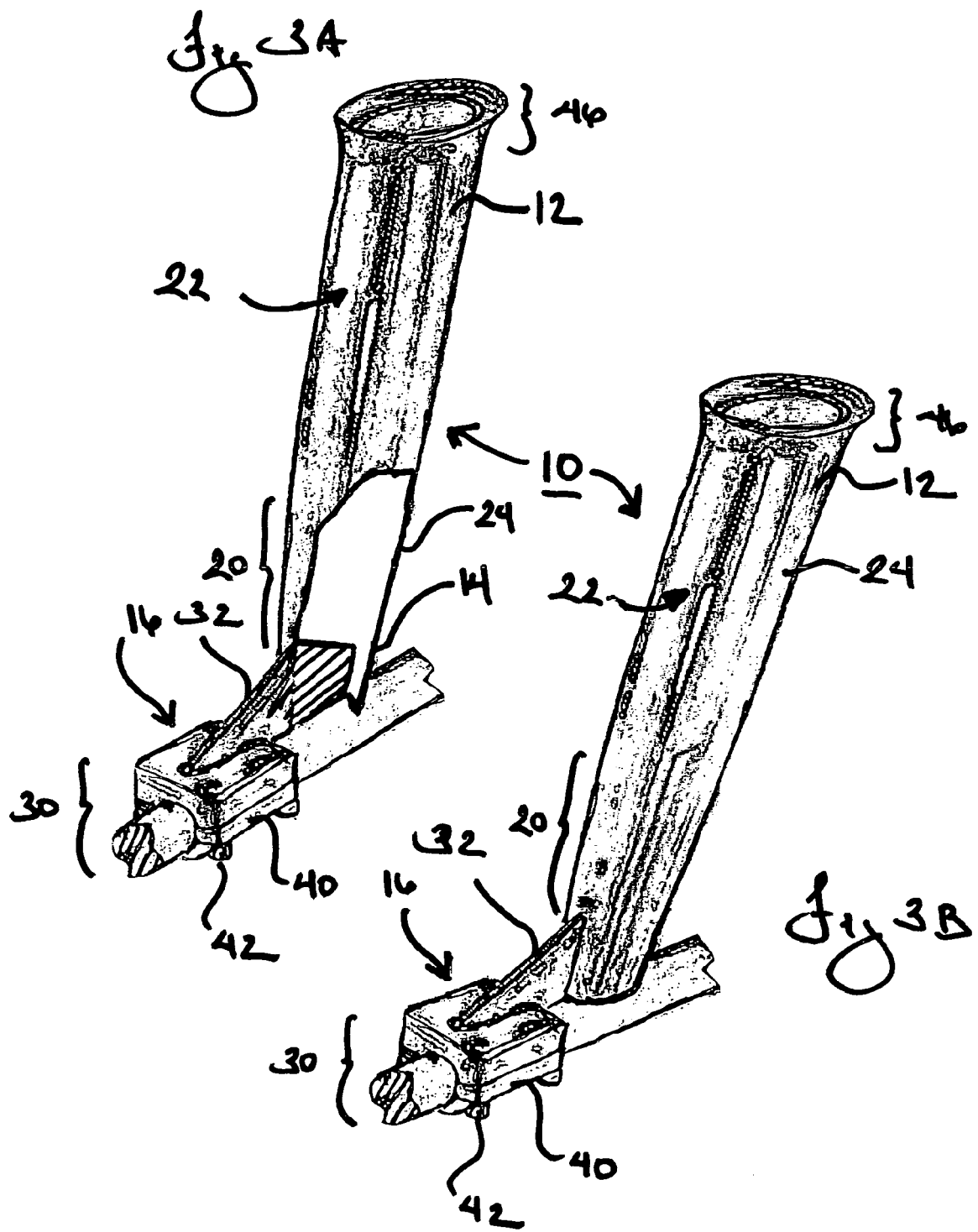
FIG. 3A is a cutaway illustration of the rod holder of FIG. 2.
FIG. 3B is an illustration showing details of the rod holder of FIG. 2.
Figure 4:
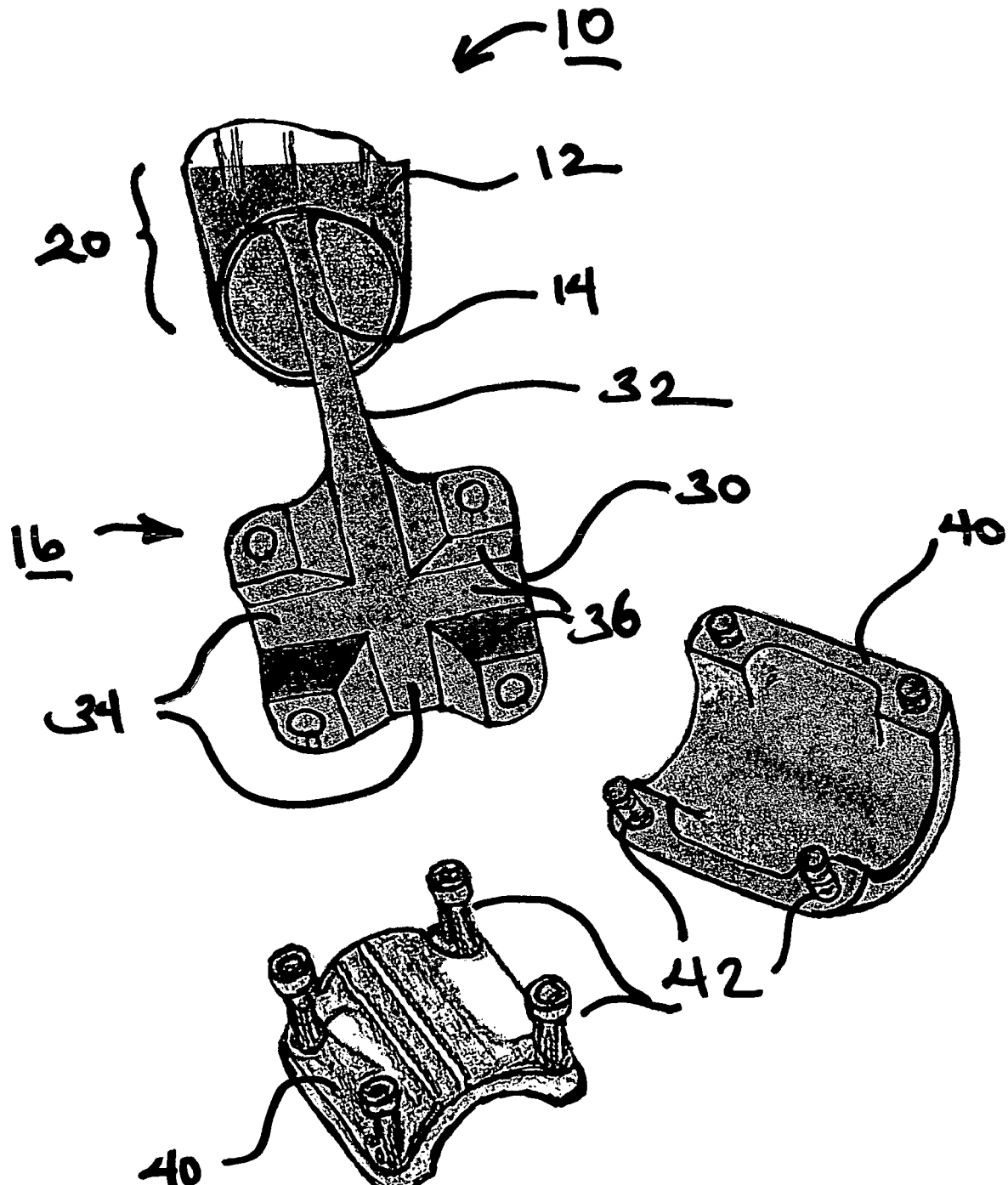
FIG. 4 is an illustration showing further details of the rod holder of FIGS. 3A and 3B.
Figure 5:
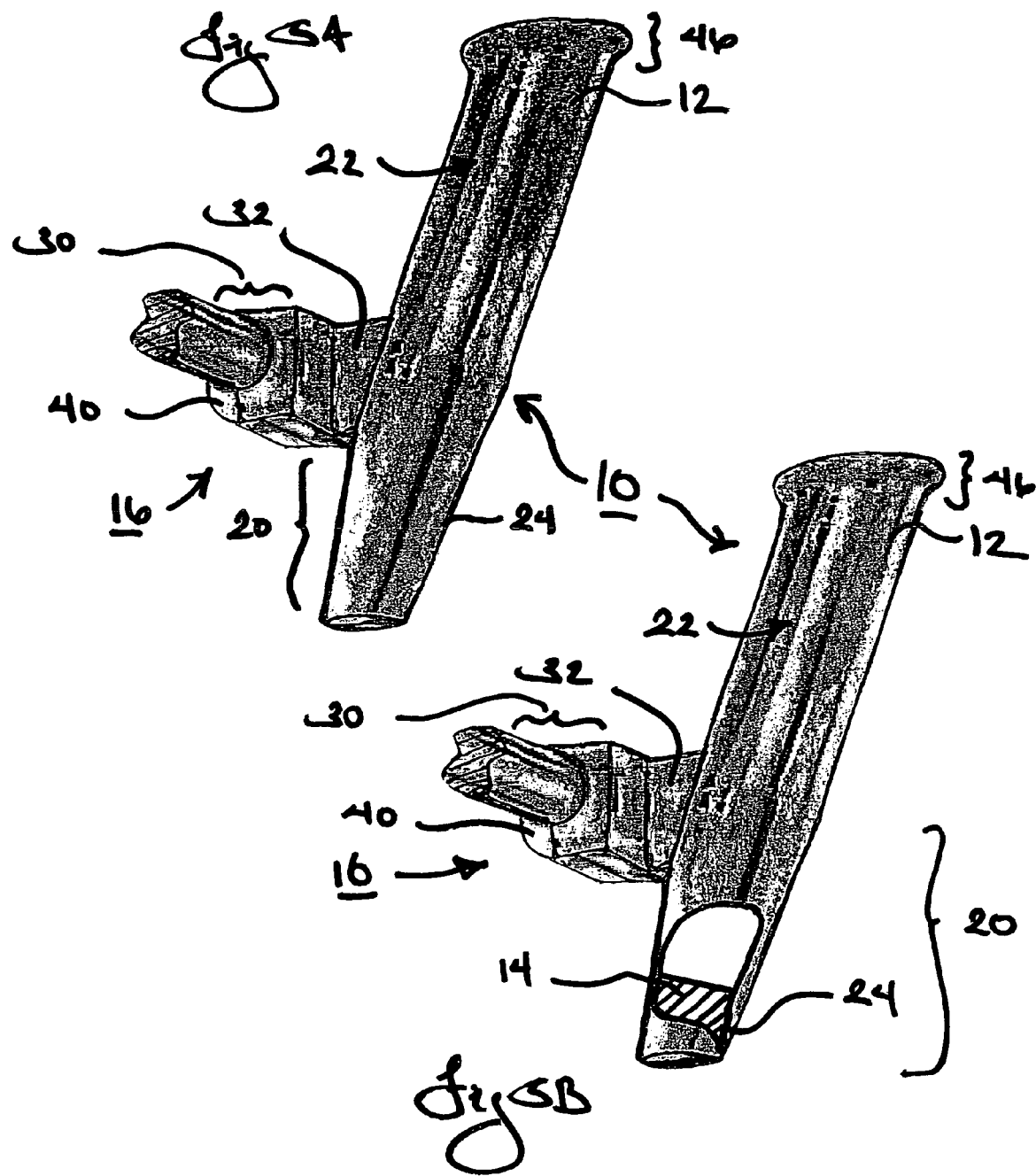
FIG. 5A is an illustration showing details of the rod holder of FIG. 2.
FIG. 5B is a cutaway illustration of the rod holder of FIG. 1.

Also as best seen in FIGS. 3A, 4, 5B, and 6B, taper 20 increases toward the distal end of tube 12. The internal stop 14 may be integral with tube 12. As best seen in FIGS. 3A, 3B, and 4, the internal stop 14 may be integral with tube 12 and web 32, for example, cast as a single body. An end of the internal stop 14 nearest to the one end of tube 12 may be substantially perpendicular to longitudinal axis of tube 12. Stop 14 may also be dimensioned to accommodate any one of an anti-rotation feature of a rod handle end and an end of any other implement. Applicant has used a thickness of about ¼ inch for the stop 14.

Any mounting feature 16 consistent with the present invention may be used. Two such mounting features 16 include a clamp 30, as best seen in FIGS. 3A, 3B, 4, 5A, and 5B, and a surface mounting feature 44, as best seen in FIGS. 6A and 6B. A surface mounting feature 44 accommodates mounting the rod holder 10 to a surface of a boat as best seen in FIGS. 1, 6A, and 6B. A clamp 30 accommodates mounting the rod holder 10 to a projection from a boat as best seen in FIGS. 1, 2, 3A, 3B, 5A, and 5B.

As best seen in FIGS. 1, 2, 3A, 3B, 4, 5A, 5B, 6A, 6B, and 7, the mounting feature 16 allows the rod holder 10 and, in particular the longitudinal axis of the tube 12, to be set at an angle with respect to any one of horizontal and vertical. Such angles, with respect to the vertical, may be from about 0 to 30 degrees. Some specific angles are 0, 15 and 30.

As best seen in FIG. 6B, a flare transition 46 from the tube 12 and the mounting the surface mounting feature 44 may be included to assist with the placement, removal and replacement of a rod handle in rod holder 10. Further, the surface mounting feature 44 may include apertures 50 for fasteners 52, such as, for example, screws or through bolts.

As best seen in FIGS. 1, 2, 3A, 3B, 5A, 5B, and 7, the rod holder 10 may further include a web 32. The web 32 is particularly useful when the mounting feature 16 is a clamp 30. In such a case, the web 32 facilitates positioning the rod holder 10 in such a manner that the tube 12 is spaced away from a surface, while at the same time, allowing rod holder 10 to be accommodated.

As best seen in FIG. 4, the clamp 30 may include a multiple directional alignment feature 34. Such alignment feature 34 may include a gripping surface 36 that may crease the surface of the material to which the rod holder 10 is clamped. The clamp 30 can further include a cap 40 and fasteners 52. The cap 40 may be set up in a manner that the clamp 30 surrounds the material, such as a tubular material, when mounting the rod holder 10 to the boat. The clamp 30 may be located anywhere from the open end to the distal end of the tube 12. When the clamp 30 is at the bottom, the web 32, the stop 14, and the web 32 may be formed integrally. Alternatively, the web 32, the stop 14 and the tube 12 may be integrally formed.

In fabricating rod holder 10 according to the present invention, the tube 12 may be cast from any of a variety of, for example, steel, titanium, or aluminum. A stainless steel may be particularly beneficial since this material may accommodate corrosion resistance, while at the same time, providing aesthetics. A variety of casting techniques may include, for example, die casting, investment casting, and sand casting. Applicant has found that investment casting rod holder 10 is an appropriate method.

In operation, rod holder 10 includes a tube 12 with an opening at one end for accepting a rod handle and an internal stop 14 that is distal to the end for stopping the rod handle. A taper 20, which increases as the distance from the open end increases, guides the end of the rod handle to engage internal stop 14. When a rod handle includes an anti-rotation device, the taper 20 may help with the rapid insertion of the rod handle. The taper 20 may be designed to accommodate at least 70 percent, preferably at least 90 percent, of the rods that are commercially available.

A thin wall for tube 12 permits a balance of the materials quantity and the rod holder weight. To that end, any material that may satisfy this balance may be used to yield the thin wall. Appropriate materials impart sufficient strength to withstand the placement, removal and replacement of a rod in the rod hold 10. The tube 12 may have a wall thickness between about 1 and 3 millimeters. Another measure of the tube 12's appropriateness may to may be expressed as a ratio of the outside diameter of the tube 10 to the wall thickness of the tube 10 that may be between about 20:1 and 50:1.

The polished surface 22 may be for the most part an aesthetic feature of the rod holder 10 and preferably would be a visible surface. The coating 24 may impart a corrosion resistance to the rod holder 10. In such a case, the coating 24 might cover all or substantially the entire rod holder 10, including the tube 12. Alternatively, the coating 24 may be ornamental. In such a case, the coating 24 may be one of a variety of colors such as gold, black, green, red, blue, or silver.

As best seen in FIGS. 1, 2, 3A, 3B, 4, 5A, 5B, 6A, 6B, and 7, the mounting feature 16 allows the rod holder 10 and, in particular the longitudinal axis of the tube 12, to be set at an angle with respect to any one of horizontal or vertical. Such angles, with respect to the vertical, may be from about 0 to 30 degrees. Some specific angles are 0, 15 and 30.

As best seen in FIGS. 1, 2, 3A, 3B, 5A, 5B, and 7, the web 32 is particularly useful when the mounting feature 16 is a clamp 30. In such a case, the web 32 facilitates positioning the rod holder 10 in such a manner that the tube 12 is spaced away from a surface while at the same time allowing rod holder 10 to be accommodated.

As best seen in FIG. 4, the multiple directional alignment feature 34 permits the rod holder to be mounted in a variety of orientations. The gripping surface 36 of the clamp permits the creasing of the surface of the material to which the rod holder 10 is clamped. The cap 40 and fasteners 52 permit the clamp 30 to surround the material, such as a tubular material, when mounting the rod holder 10 to the boat.

Certain modifications and improvements will occur to those skilled in the art upon a reading of the foregoing description. In the preferred embodiment, the open end is flared to aid in inserting the rod end into the holder but some applications may not be flared depending on how and to what part of the boat the holder is attached. Also, in the preferred embodiment, there is a web between the wall and the mounting flange but the mounting flange could be made directly a part of the in-wall tube itself. Furthermore, while the tube would normally be a solid wall, the tube wall could have apertures or slots in it for aesthetic or weight reduction. Also, the web portion could include an aperture through the web for a bungee cord attachment point for securing a fishing rod to the rod holder. It should be understood that all such modifications and improvements have been deleted herein for the sake of conciseness and readability but are properly within the scope of the following claims.

The invention claimed is:

1. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper;
   (d) a mounting feature; and
   (e) a web between said tube and said mounting feature.

2. The rod holder according to claim 1, wherein said mounting feature is a surface mounting feature.

3. The rod holder according to claim 2, further including a flared transition between said tube and said surface mounting feature.

4. The rod holder according to claim 3, further including at least one mounting hardware aperture.

5. The rod holder according to claim 4, further including mounting hardware.

6. The rod holder according to claim 5, wherein said hardware is any one of through-hole bolts and screws.

7. The rod holder according to claim 1, wherein said mounting feature permits said rod holder to be mounted so that the longitudinal axis of said tube is at an angle with respect to the vertical.

8. The rod holder according to claim 7, wherein said angle with respect to the vertical is between about 0° and 30°.

9. The rod holder according to claim 7, wherein said angle with respect to the vertical is selected from the group consisting of about 0°, about 15°, about 20° and about 30°.

10. The rod holder according to claim 1, wherein said web between said tube and said mounting feature attaches to said tube anywhere along said length of said tube.

11. The rod holder according to claim 10, wherein said stop and said web are integral.

12. The rod holder according to claim 10, wherein said stop, said web and said tube are integral.

13. The rod holder according to claim 1, wherein said first end is flared.

14. The rod holder according to claim 1, wherein said stop is substantially perpendicular to a longitudinal axis of said tube.

15. The rod holder according to claim 14, wherein a thickness of said internal stop is dimensioned to accommodate the anti-rotation feature of the fishing rod handle.

16. The rod holder according to claim 15, wherein thickness of said internal stop is about ¼ inch.

17. The rod holder according to claim 1, wherein at least said tube is made of a castable material.

18. The rod holder according to claim 17, wherein said tube is made of a metal selected from the group consisting of steel, titanium and aluminum.

19. The rod holder of claim 18, wherein said tube is made of a steel comprising stainless steel.

20. The rod holder according to claim 17, wherein said tube is formed of a process selected from the group consisting of die casting, investment casting and sand casting.

21. The rod holder according to claim 20, wherein said tube is formed of investment casting.

22. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper;
   (d) a multi-directional alignment feature; and
   (e) a separate cap configured to fasten to said multi-directional alignment feature.

23. The rod holder according to claim 22, further including gripping surfaces.

24. The rod holder according to claim 23, wherein said gripping surfaces crease the material that the mounting feature engages.

25. The rod holder according to claim 24, further including at least one fastener configured to fasten said cap to said multi-directional alignment feature.

26. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper;
   (d) a mounting feature; and
   (e) wherein said tube is thin walled with a thickness of between about 1 and 3 millimeters.

27. The rod holder according to claim 26, wherein said thin walled tube has a tube outside diameter to wall thickness ratio between about 20:1 and 50:1.

28. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper;
   (d) a mounting feature; and
   (e) a polished surface.

29. The rod holder according to claim 28, wherein said polished surface is visible.

30. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper;
   (d) a mounting feature; and
   (e) a coating.

31. The rod holder according to claim 30, wherein said coating is corrosion resistant.

32. The rod holder according to claim 30, wherein said coating is ornamental.

33. The rod holder according to claim 32, wherein said coating is any one color selected from the group consisting of gold, black, green, red, blue and silver.

34. The rod holder according to claim 30, wherein said coating is obtained by any process selected from the group consisting of physical vapor deposition (PVD), chemical vapor decomposition (CVD), electroplating, auto catalytic (electroless), plating, electrochemical conversion (anodizing), thermal spraying, conversion coating and combination thereof.

35. The rod holder according to claim 34, wherein said coating is obtained by physical vapor deposition (PVD).

36. The rod holder according to claim 35, wherein said coating is a titanium nitride.

37. A monolithic rod holder made of single composition comprising:
   (a) a tube having first and second ends, said tube being open at said first end;
   (b) an essentially completely internal stop distal to said first end, wherein said stop is integrally formed together with said tube in one piece;
   (c) a taper, wherein said taper is for guiding a fishing rod handle including an anti-rotation feature; and
   (d) a mounting feature.

38. The rod holder according to claim 37, wherein said taper is sized to accommodate at least 90% of commercially available fishing rods including an anti-rotation feature.

39. The rod holder according to claim 38, wherein said taper is sized to accommodate at least 70% of commercially available fishing rods including an anti-rotation feature.

40. The rod holder according to claim 37, wherein said taper is increasing distally from said second end.

* * * * *